Figure 1:
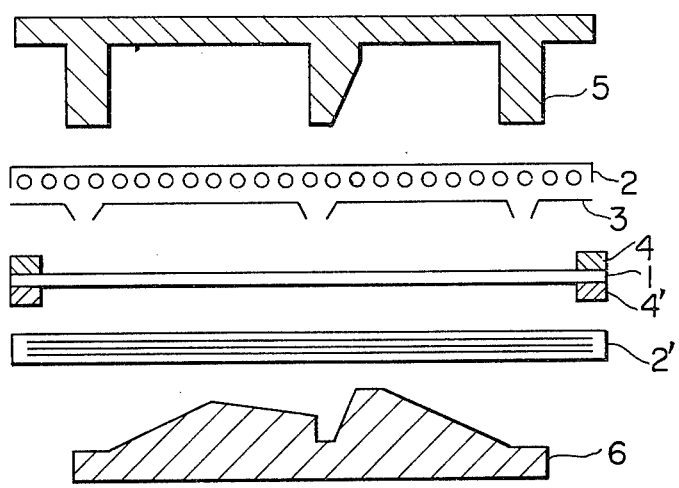

United States Patent [19]

Kojimoto et al.

[11] 4,248,651

[45] Feb. 3, 1981

[54] THERMOFORMING PROCESS OF CORRUGATED PLASTIC BOARD

[75] Inventors: Susumu Kojimoto; Tadatoshi Ogawa; Youzou Abe, all of Takatsuki, Japan

[73] Assignee: Sumitomo Chemical Company, Limited, Osaka, Japan

[21] Appl. No.: 736,073

[22] Filed: Oct. 27, 1976

[30] Foreign Application Priority Data

Nov. 7, 1975 [JP] Japan ................. 50/134349

[51] Int. Cl.$^3$ ................. B29C 17/00; B29C 3/00
[52] U.S. Cl. ................. 156/198; 156/207; 156/220; 156/221; 156/245; 264/292; 264/321; 264/322; 264/554
[58] Field of Search ................. 264/92, 287, 294, 296, 264/320, 322, 321, 292, 554; 156/221, 222, 220, 245, 198, 207, 78, 93, 228, 581; 428/186

[56] References Cited

U.S. PATENT DOCUMENTS

| | | | |
|---|---|---|---|
| 2,100,891 | 11/1937 | Zinser | 264/287 |
| 2,958,620 | 11/1960 | Ono | 156/198 X |
| 3,406,052 | 10/1968 | Peters | 156/198 |

Primary Examiner—John T. Goolkasian
Assistant Examiner—Thomas Bokan
Attorney, Agent, or Firm—Stevens, Davis, Miller & Mosher

[57] ABSTRACT

An improved thermoforming process for the production of formed articles of corrugated plastic board having small radius curvatures and deep drawings, which comprises heating said corrugated plastic board at the portions to be formed into small radius curvatures or deep drawings more intensively than at the other portions, and applying pressure to said portions thereby crushing the rib structure in said portions without crushing the rib structure in said other portions.

7 Claims, 2 Drawing Figures

THERMOFORMING PROCESS OF CORRUGATED PLASTIC BOARD

The present invention relates to an improved thermoforming process for the production of formed articles of corrugated plastic board having small radius curvatures and deep drawings locally which are generally difficult to form in the case of corrugated plastic board. The radius curvature is referred to simply as "R" hereinafter.

Hitherto, such formed articles of corrugated plastic board produced by thermoforming corrugated plastic board or composite corrugated plastic board comprising corrugated plastic board as a base material and one or more adherends. In this case, however, the size of R and draw ratio (height/width) are limited by the forms of ribs making up the corrugated plastic board as a base material.

Since, in a word, corrugated plastic board comprising two sheets and a corrugated rib or parallel rib therebetween is different in the size of elongation on thermoforming between machinary direction and transverse direction, the size of thermoformable R is limited to 8 to 20 mm R and the maximum draw ratio is also as small as 0.15.

When articles to be formed have a small R or a large draw ratio locally even if its shape or design itself is thermoformable, the formed articles of corrugated plastic board is broken because of a high degree of unevenness of elongation.

Even when corrugated plastic board has an x-pattern rib and therefore shows no difference in the size of the elongation on thermoforming between machinary direction and transverse direction, the size of formable R is limited to 4 to 5 mm R and the maximum draw ratio is 0.3. Consequently, when such corrugated plastic board is thermoformed into articles locally having unevenness beyond said R limit or maximum draw ratio, the appearance of the articles is damaged by uneven elongation and rib pattern which becomes visible through the board wall.

The same tendency is likewise observed when composite corrugated plastic board having one- or multilayer laminating sheet at surface thereof is used. In this case, particularly, the draw ratio becomes small and R becomes large because of the flexibility of the laminating sheet and breaking or uneven elongation of the sheet occurs on thermoforming.

It may be considered that these defects are obviated by a thermoforming process which comprises heating the whole corrugated plastic board to a little higher temperature than usual. This process has however a defect in that the whole rib structure in the plastic board disappears resulting in a great reduction in the stiffness characteristics of the corrugated plastic board.

The inventors extensively studied to overcome the foregoing problems and found that they can sufficiently be solved by the following process. Corrugated plastic board having inner hollow portions made by properly shaped ribs, or composite corrugated plastic board comprising said board as a base material and a one- or multi-layer laminating sheet can be thermoformed into articles locally having small Rs and deep drawings by heating said board or said composite board at the portions to be formed into small Rs or deep drawings more intensively than at the other portions, and applying pressure to said portions thereby crushing the rib structure alone in said portions without crushing the rib structure in said other portions.

In the process of the present invention, the portions formed into small Rs or deep drawings are changed into solid sheet as the rib structure in portions are crushed by local heating and pressure. Consequently, uneven elongation due to the rib structure is eliminated.

Further, since the size of formable R is a minimum of 2 to 3 mm R, it becomes possible to produce formed articles having a very small R as compared with the conventional formed articles. In addition, since the portions of corrugated plastic board formed into small Rs or deep drawings are changed into solid sheet by the process of the present invention, the portions have the same maximum draw ratio as that of the resin as a material for the corrugated plastic board. Consequently, the plastic board can be thermoformed within the same wide range of forming conditions as in the material resin.

The rib structure in the portions other than the portions formed into small Rs or deep drawings is maintained uncrushed because it is heated under the usual condition which causes no breaking of the structure. Therefore, the formed articles show no reduction in stiffness and have excellent surface state.

In the case of composite corrugated plastic board obtained by sticking a one- or multi-layer laminating sheet to the surface of corrugated plastic board, the degree of uneven elongation becomes further small because of the flexibility of the adherend as compared with corrugated plastic board with no adherend, and further the laminating sheet is not broken. Therefore, there can be obtained formed articles having excellent surface state, for example, beautiful appearance.

The properly shaped rib structure referred to in the present invention is not limited to those shown herein.

In the present invention, the corrugated plastic board having a rib structure which is particularly suitable for the thermoforming with local intensive heating is one having an x-pattern rib.

The corrugated plastic board having an x-pattern rib is produced by placing two pieces of thermoplastic resin sheet having parallel ribs integrally molded on one side thereof one upon the other, with the sides having parallel ribs facing each other and with the directions of rib crossed obliquely, and joining the ribs at the intersecting points thereby forming the two pieces of thermoplastic resin sheet into one sheet.

Such corrugated plastic board has a low degree of the anisotropy of mechanical properties so that uneven elongation is difficult to occur on thermoforming. Further, the board is particularly suitable for forming into various shapes, because it has a wide range of formable draw ratio.

As the materials for corrugated plastic board used in the present invention, there may be exemplified thermoplastic synthetic resins such as polyolefin resins (e.g. polyethylene, polypropylene), polyvinyl chloride resins, polystyrene resins (e.g. impact-resistant polystyrene), ABS resins, polyamide resins and the like. The thickness of the corrugated plastic board is 2 to 10 mm, and preferably 3 to 5 mm.

When composite corrugated plastic board is used in the present invention, a laminating sheet is used as a decorative overlay sheet. The laminating sheet includes synthetic resin sheet or film, foamed synthetic resin sheet or film, synthetic leather, non-woven fabric, woven fabric, and composites thereof. As the composites, there may be exemplified composites of foamed polyethylene with polyvinyl chloride leather, foamed polyethylene sheet, foamed polypropylene sheet or polyvinyl chloride sheet.

In the production of the foregoing composite corrugated plastic boards, the corrugated plastic board and laminating sheet may be joined by any method of melt adhesion, sticking with adhesives, stitching with yarns, sticking by means of a stitching machine and the like. Alternatively, the board and laminating sheet may be stuck together with simultaneous thermoforming operation.

The thermoforming process of the present invention may be any of vacuum forming, matched die forming, pressure forming and the like. As the equipments used for the local crushing of the rib structure, there may be used any of those which can apply pressure to the whole and part of the board.

Another characteristic of the present invention is as follows: Even when a pressure is applied to the whole corrugated plastic board, the rib structures alone of the locally intensively heated portions are softened and crushed and those of the other portions under the normal heating condition are restored to original state thereof. Consequently, the rib effect, namely, the characteristic property of the corrugated plastic board does not change before and after the thermoforming.

As the method for local heating, there may be used various methods of, for example, masking a heater, increasing a heater capacity for local intensive heating, local intensive heating with a heater mounted on a mold, local blowing with hot air, contacting the portions to be locally heating with a heating medium and the like.

In a word, any method may be applied if it can produce the heating conditions wherein intensive heating can be applied to the portions formed into small Rs and deep drawings, with the other portions maintained in a normal heating state for thermoforming the corrugated plastic board.

The intensive heating referred to herein means heating corrugated plastic board to temperatures higher than the maximum forming temperature of the board. A preferred heating temperature is about 10° to about 20° C. higher than said maximum temperature.

The maximum forming temperature of corrugated plastic board referred to herein depends upon the material resin of the board and forming pressure so that it can not be determined generally. It is however defined to be the maximum temperature at which the rib structure is kept uncrushed under a definite forming pressure. This temperature can easily be determined experimentally. For example, it is about 150° C. for corrugated polypropylene board and about 125° C. for corrugated board of high density polyethylene.

The process for thermoforming corrugated plastic board according to the invention will be illustrated with reference to the accompanying drqwings, which are only given for the purpose of illustration and not to be interpreted as limiting the present invention thereto.

Figure 2:
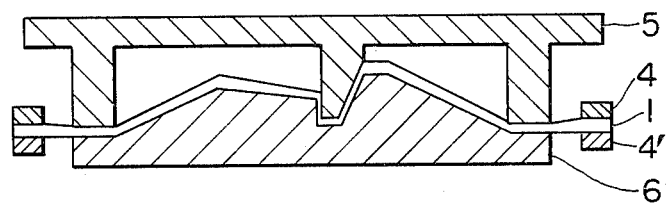

FIGS. 1 and 2 are schematic side views of one embodiment of the present thermoforming process. FIG. 1 is the side view prior to thermoforming and FIG. 2 is the one after thermoforming. In FIGS. 1 and 2, 1 is sheet of corrugated plastic board, 2 and 2' a heater, 3 a mask, 4 a clamp, 5 a plug and 6 a mold. The sheet 1 is mounted between the upper and lower clamps 4, 4' and heated by means of the upper and lower heaters 2 and 2'. In this case, when the upper heater 2 is covered with the mask 3, a temperature difference is produced in the sheet 1 (see FIG. 1).

Next, pressure is applied to the sheet 1 by means of the plug 5 and at the same time the portions of the sheet applied with pressure are vacuum-sucked through holes (not shown) made in the mold 6. Thus, the rib structure of the locally intensively heated portions is crushed and formed into small Rs or deep drawings (see FIG. 2).

The process of the present invention can preferably be applied to the preparation of various cases, for example, cases for musical instruments, travelling bags and attaché cases; and interior materials for automobiles, for example, roof trim and door trim.

EXAMPLE 1

Arachne base cloth as a decorative overlay was heat-stuck to the surface of corrugated polypropylene board having an x-pattern rib structure, via adhesive film comprising an ethylene-vinyl acetate copolymer. Thus, composite plastic sheet was produced. Said Arachne base cloth was "Arafnon G-411", cloth woven by means of Arachne weaving machine (manufactured by Takayasu Co., Ltd.; web, rayon staple; warp, nylon filament; weight, 160 g/m$^2$). Said corrugated polypropylene board was "Sunply ®" (manufactured by Nippon Sunply Co., Ltd.; weight, 850 g/m$^2$; thickness, 4.5 mm).

The composite polypropylene board was thermoformed according to plug-assist vacuum forming into roof trim for automobiles (size, 1,300 W × 1,900 L × 160 H; draw ratio, about 0.12 as a whole, about 1.0 for the head console portion; R, 4 mm R) under the following conditions. The portion of the board to be formed into the head console was kept at about 165° C. by masking a heater mounted on the vacuum forming machine and the other portions were kept at about 140° C. (the maximum forming temperature about 150° C.). In this way, a temperature difference was produced in the composite board.

Thermoformed roof trim was thus obtained without uneven elongation and rib pattern at the head console portion thereof and further with a maximum draw ratio larger than that of original corrugated polypropylene board. The other portion of the roof trim had a beautiful surface appearance and showed no reduction in stiffness because the rib structure was kept uncrushed.

Further, the adhesive strength between the corrugated polypropylene board and the decorative overlay at the heat console portion intensively heated was rather higher than that of the other portions.

What is claimed is:

1. An improved thermoforming process for the production of formed articles of corrugated plastic board comprising two sheets and corrugated ribs, parallel ribs or X-pattern ribs therebetween and having small radius curvatures and deep drawings, which comprises heating said corrugated plastic board at the portions to be formed into small radius curvatures or deep drawings more intensively than at the other portions, and applying pressure to said portions thereby crushing the rib structure in said portions without crushing the rib structure in said other portions.

2. An improved thermoforming process according to claim 1, wherein said corrugated plastic board is composite corrugated plastic board comprising corrugated plastic board as a base material and a one- or multi-layer laminating sheet.

3. An improved thermoforming process according to claim 1, wherein said radius curvature is 2 to 3 mm.

4. An improved thermoforming process according to claim 2, wherein said laminating sheet is a member selected from the group consisting of synthetic resin sheet or film, foamed synthetic resin sheet or film, synthetic leather, woven fabric and non-woven fabric.

5. An improved thermoforming process according to claim 1, wherein the forming temperature of said portions to be formed into small radius curvatures or deep drawings is about 10° to about 20° C. higher than the maximum forming temperature of the corrugated plastic board.

6. An improved thermoforming process according to claim 1, wherein said corrugated plastic board is 2 to 10 mm in thickness.

7. An improved thermoforming process according to claim 1, wherein said corrugated plastic board has an x-pattern rib structure.

* * * * *